W. T. KING.
SPRAYING DEVICE.
APPLICATION FILED NOV. 25, 1910.

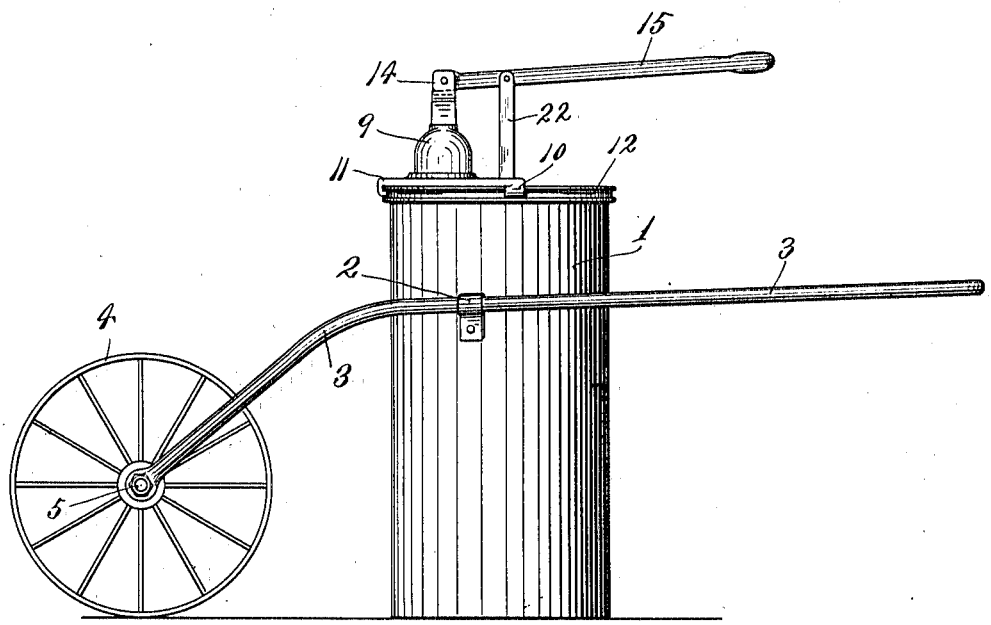
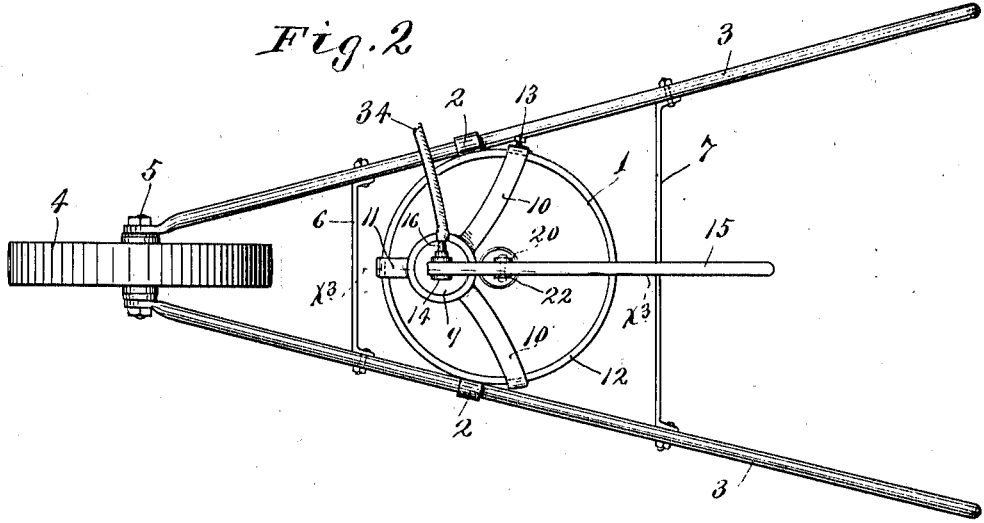

1,059,373.

Patented Apr. 22, 1913.
2 SHEETS—SHEET 2.

Witnesses.
A. H. Opsahl.
Harry Opsahl.

Inventor.
W. T. King.
By his Attorneys.
Williamson Merchant

UNITED STATES PATENT OFFICE.

WILLIAM T. KING, OF MINNEAPOLIS, MINNESOTA, ASSIGNOR TO BRANDT MANUFACTURING COMPANY, OF MINNEAPOLIS, MINNESOTA, A CORPORATION OF MINNESOTA.

SPRAYING DEVICE.

1,059,373.     Specification of Letters Patent.     Patented Apr. 22, 1913.

Application filed November 25, 1910. Serial No. 594,044.

*To all whom it may concern:*

Be it known that I, WILLIAM T. KING, a citizen of the United States, residing at Minneapolis, in the county of Hennepin and State of Minnesota, have invented certain new and useful Improvements in Spraying Devices; and I do hereby declare the following to be a full, clear, and exact description of the invention, such as will enable others skilled in the art to which it appertains to make and use the same.

My invention has for its object to provide an improved spraying device adapted for use generally for spraying liquids, but especially adapted for use for spraying poisonous liquids or liquid germicides in the orchard and garden.

More particularly, the invention is designed to meet the special requirements of a small orchardist, gardener and fruit grower who needs something larger than a knapsack sprayer but does not require anything as large as a horse propelled or power outfit.

The present improved sprayer is adapted to be wheeled after the plan of a wheel barrow and is usually provided with a tank adapted to carry about fifteen gallons of the spraying liquid or germ or fungus destroying solution. The pump and air chamber are carried by and located within the liquid supply tank, and the pump is adapted to be operated by a simple lever.

Generally stated, the invention consists of the novel devices and combinations of devices hereinafter described and defined in the claim.

In the accompanying drawings which illustrate the invention, like characters indicate like parts throughout the several views.

Figure 3:
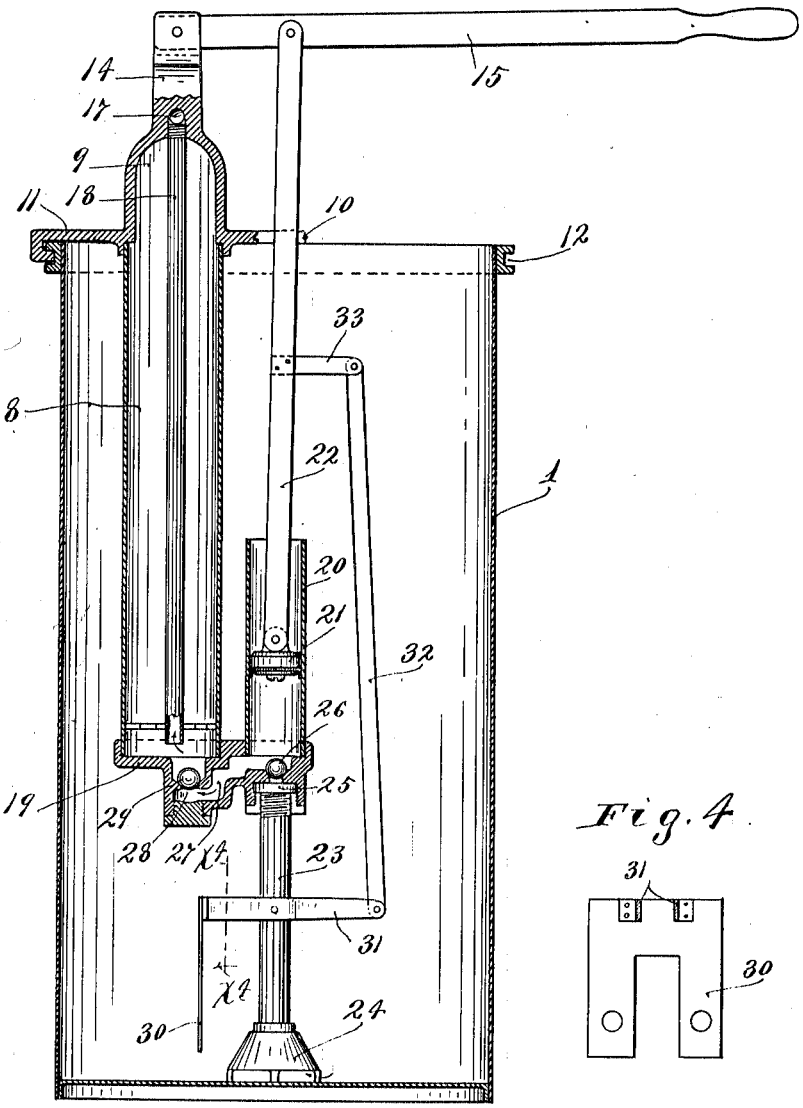
Figure 4:
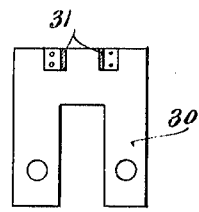

Referring to the drawings, Figure 1 is a view in side elevation, showing the improved spraying apparatus; Fig. 2 is a plan view of the same; Fig. 3 is a view chiefly in vertical section, taken on the line $x^3$ $x^3$ of Fig. 2, some parts being broken away and some parts being shown in full; and Fig. 4 is a detail in vertical section taken on the line $x^4$ $x^4$ of Fig. 3.

The liquid containing tank 1 is secured by hanger brackets 2 to the intermediate portions of a pair of rearwardly diverging handle bars 3, to the front ends of which a wheel 4 is journaled by means of a nutted bolt 5. In front of the tank 1, the bars 3 are rigidly but detachably connected by a tie bar 6, and at the rear of said tank, they are likewise connected by a tie bar 7, the ends of which tie bars are preferably bolted to the said bars.

In this improved spraying apparatus, an air chamber or reservoir is provided, at its upper portion, with diverging legs constituting a spider-like head which is detachably secured to the upper edge rim of the tank 1. This air chamber, as shown, is made up of a cylinder 8 and a cap or hollow crown 9, to which it is rigidly secured at its upper end. The cap 9 is provided with a pair of relatively long arms 10 and a relatively short arm 11, and the ends of these arms are made hook-shaped for engagement with a peripherally grooved reinforcing rim 12 secured to the upper edge of the tank 1. One of the arms 10 is also shown as provided with a set screw 13 that is engageable with the grooved rim 12, to rigidly but detachably secure the said arms and, hence, the air chamber to the liquid tank, with the main body portion of the said chamber extending into the said tank, with its axis eccentric to the axis of the said tank. The cap 9 is provided with an upwardly extended portion which affords a fulcrum or pivotal support 14 for a pump operating lever 15.

A spray discharging nipple 16 leads laterally from a discharge port 17 formed in the upper portion of the cap 9. The tube 18 communicates at its upper end with the said port 17 and at its lower end, extends nearly to the bottom of the cylinder 8. At its lower end, the cylinder 8 of the air chamber or reservoir is rigidly secured to a cylinder head casting 19. This cylinder head casting 19 is extended, at one side, from the cylinder 8, and is rigidly secured to the lower end of a pump cylinder 20, which pump cylinder is, in the arrangement described, located at or approximately at the axis of the tank 1. Working in the pump cylinder 20 is a piston 21 that is connected by a long rod 22 to the lever 15.

A suction pipe 23 is connected, at its upper end, to the cylinder head casting 19 and, at its lower end, is shown as provided with a flaring head 24 that is located close to the bottom of the tank 1. The upper extremity of the suction pipe 23 is connected to the lower portion of the pump cylinder 20, through a port 25 provided, as shown, with a ball check valve 26. The lower ends of the cylinders 8 and 20 are connected by a passage 27 having a port 28 that is normally closed by a ball check valve 29. The check valves 26 and 29 coöperate, under reciprocating movements of the piston 21, to cause a flow of liquid upward through the pipe 23 into the lower end of the cylinder 20, from thence into the cylinder 8 of the air chamber or reservoir. The liquid from the lower portion of the cylinder 8 will be caused to flow upward through the tube 18, but air will always be stored, under greater or less compression, in the upper portion of the said air chamber, so that the spraying action will be continuous under reciprocating movements of the pump piston, and furthermore, will force a continued discharge of spray for a considerable time after the pump action has been stopped.

The various liquids used in an apparatus of this kind, such, for instance, as the Bordeaux mixture, arsenite of lead or so-called mineral paints, require continuous agitation to prevent settling in solid portions. Hence, I provide an agitator, preferably in the form of a bifurcated agitating blade 30, which, as shown, is secured to a two-part lever 31 intermediately pivoted to the pipe 23 and connected, by a link 32, to a projection 33 of the pump rod 22. As is evident, under each pump actuating movement of the lever 15, the agitating blade 30 will be oscillated, thereby keeping the liquid stirred up and preventing the settling of sediment in the bottom of the tank.

The described arrangement connects the pump to the air chamber, so that it will be applied in working position and removed from the tank with the said air chamber and, furthermore, keeps the pump submerged in the liquid, so that priming of the pump is not required. The air chamber is extended both above and below the liquid and above and below the spider which supports it from the tank, so that it may be made long and the projecting portion thereof arranged to serve as a fulcrum for the pump actuating lever. By locating the air chamber eccentric to the axis of the tank and with the pump cylinder concentric to the axis of the tank, the lever is best arranged for action on the pump and a large space is left between the long prongs 10, for the introduction of the liquid into the tank, while the pump and air chamber are positioned within the tank.

The discharge nipple 16 is connected to one end of a hose or flexible liquid delivery tube 34 which, in practice, will be connected either directly to a spraying head or to a metal tube having a spraying head applied to the delivery end thereof.

The device described has been put into actual use and has been found highly efficient for the purposes had in view.

What I claim is:

In a spraying device, the combination with a liquid containing tank and an air chamber having relatively long and short spider arms for securing the same to the upper edge rim of said tank, an upwardly extended hollow cap cast integral with said arms and terminating in an upwardly extended fulcrum lug and the said lug having a discharge port opening laterally therethrough, of a liquid discharge tube connected at its upper end to the said discharge port and extending downward approximately to the bottom of said air chamber, a pump actuating lever pivoted to the said fulcrum lug, a base casting secured to the lower end of said air chamber, a pump having its cylinder rigidly secured at its lower end to said base casting, a suction pipe extending downward from said base casting nearly to the bottom of said tank, valved ports and passages connecting said suction pipe with said pump cylinder and the said pump cylinder with the bottom of said air chamber, and a pump rod connecting said lever to the piston of said pump, the said pump cylinder being located below the top of said tank and disposed substantially axially of said tank and the said air chamber being located eccentric to the axis of said tank, and the said pump lever extending from its pivoted end midway between the long spider arms of the said air chamber, substantially as described.

In testimony whereof I affix my signature in presence of two witnesses.

WILLIAM T. KING.

Witnesses:
BERNICE G. WHEELER,
HARRY D. KILGORE.